United States Patent
Shoolman et al.

(10) Patent No.: US 12,045,143 B2
(45) Date of Patent: *Jul. 23, 2024

(54) METHODS, SYSTEMS, AND MEDIA FOR CONTROLLING APPEND-ONLY FILE REWRITES

(71) Applicant: Redis Ltd., Tel-Aviv (IL)

(72) Inventors: Yiftach Shoolman, Modi'in (IL); Yoav Steinberg, Kibbutz Hanita (IL); Yossi Gottlieb, Klil (IL); Oran Agra, Saar (IL)

(73) Assignee: Redis Ltd., Tel-Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,252

(22) Filed: May 9, 2023

(65) Prior Publication Data

US 2023/0273866 A1    Aug. 31, 2023

Related U.S. Application Data

(63) Continuation of application No. 17/493,366, filed on Oct. 4, 2021, now Pat. No. 11,687,419, which is a continuation of application No. 15/639,965, filed on Jun. 30, 2017, now Pat. No. 11,138,076.

(51) Int. Cl.
*G06F 11/14* (2006.01)
*G06F 16/18* (2019.01)

(52) U.S. Cl.
CPC ...... *G06F 11/1469* (2013.01); *G06F 11/1461* (2013.01); *G06F 16/1805* (2019.01); *G06F 2201/80* (2013.01); *G06F 2201/84* (2013.01)

(58) Field of Classification Search
CPC ............ G06F 11/1469; G06F 11/1461; G06F 2201/80; G06F 2201/84; G06F 16/1805
See application file for complete search history.

(56) References Cited

U.S. PATENT DOCUMENTS

| 5,991,753 A | 11/1999 | Wilde |
| 7,020,599 B1 | 3/2006 | Cao et al. |
| 8,671,249 B2 | 3/2014 | Talagala et al. |

(Continued)

FOREIGN PATENT DOCUMENTS

| CN | 102902561 A | 1/2013 |
| KR | 1020150107829 | 9/2015 |

OTHER PUBLICATIONS

Examination Report dated Jul. 6, 2022 in EP Patent Application No. 18825202.7, pp. 1-10.

(Continued)

*Primary Examiner* — Dangelino N Gortayo
(74) *Attorney, Agent, or Firm* — Byrne Poh LLP

(57) ABSTRACT

Methods, systems, and media for controlling append-only file rewrites are provided. In accordance with some embodiments, the methods comprising: determining a utilization of a shard of a database; determining whether the utilization exceeds a persistent storage utilization threshold; determining a recovery time to recover the shard from an append-only file; determining whether the recovery time exceeds a recovery time threshold; and when the utilization is determined to exceed the utilization threshold or when the recovery time is determined to exceed the recovery time threshold, causing an append-only-file rewrite to be performed.

18 Claims, 5 Drawing Sheets

(56) References Cited

U.S. PATENT DOCUMENTS

| | | |
|---|---|---|
| 8,880,787 B1 | 11/2014 | Kimmel et al. |
| 9,323,465 B2 | 4/2016 | Flynn et al. |
| 9,424,140 B1 | 8/2016 | Madhavarapu et al. |
| 10,198,463 B2 | 2/2019 | Eidson et al. |
| 11,138,076 B2 | 10/2021 | Shoolman et al. |
| 2003/0157954 A1 | 8/2003 | Medvedev et al. |
| 2004/0093407 A1 | 5/2004 | Sample |
| 2006/0117221 A1 | 6/2006 | Fisher et al. |
| 2007/0198595 A1 | 8/2007 | Obata et al. |
| 2008/0083037 A1 | 4/2008 | Kruse et al. |
| 2009/0313503 A1 | 12/2009 | Atluri et al. |
| 2010/0042996 A1 | 2/2010 | Corry et al. |
| 2010/0235681 A1 | 9/2010 | Suetsugu et al. |
| 2011/0238843 A1 | 9/2011 | Pan et al. |
| 2011/0258242 A1 | 10/2011 | Eidson et al. |
| 2012/0254130 A1 | 10/2012 | Mitra et al. |
| 2013/0024722 A1 | 1/2013 | Kotagiri et al. |
| 2013/0058394 A1 | 3/2013 | Nilsson et al. |
| 2013/0067138 A1 | 3/2013 | Schuette et al. |
| 2014/0172803 A1 | 6/2014 | Diaconu et al. |
| 2014/0279930 A1 | 9/2014 | Gupta et al. |
| 2014/0359036 A1 | 12/2014 | Blakers et al. |
| 2015/0149515 A1* | 5/2015 | Tong .................. G06F 16/00 707/812 |
| 2015/0248421 A1* | 9/2015 | Hsiao ............. G06F 11/1435 707/639 |
| 2015/0261625 A1 | 9/2015 | Cape et al. |
| 2016/0012361 A1 | 1/2016 | Sugiyama et al. |
| 2016/0034206 A1 | 2/2016 | Ryan et al. |
| 2016/0063007 A1 | 3/2016 | Iwasaki et al. |
| 2016/0085609 A1* | 3/2016 | Lu ....................... G06F 21/77 714/37 |
| 2016/0371291 A1 | 12/2016 | Shamis et al. |
| 2017/0024315 A1 | 1/2017 | Leshinsky et al. |
| 2017/0060699 A1* | 3/2017 | Hohl ............... G06F 11/1469 |
| 2018/0046549 A1 | 2/2018 | Steffko et al. |
| 2018/0150220 A1 | 5/2018 | Pandian et al. |
| 2018/0210793 A1 | 7/2018 | Mamluk |

OTHER PUBLICATIONS

Extended European Search Report dated Feb. 9, 2021 in EP Patent Application No. 18825202.7, pp. 1-11.
International Preliminary Report on Patentability dated Jan. 9, 2020 in International Application No. PCT/US2018/040590, pp. 1-5.
International Search Report and Written Opinion dated Sep. 14, 2018 in International Patent Application No. PCT/US2018/040590, pp. 1-6.
Notice of Allowance dated Feb. 15, 2023 in CN Patent Application No. 201880043668.0, pp. 1-4.
Notice of Allowance dated Mar. 20, 2023 in U.S. Appl. No. 17/493,366, pp. 1-20.
Notice of Allowance dated Jun. 1, 2021 in U.S. Appl. No. 15/639,965, pp. 1-4.
Notice of Allowance dated Jun. 26, 2023 in AU Patent Application No. 2021266299, pp. 1-3.
Notice of Allowance dated Jul. 29, 2021 in AU Patent Application No. 2018294443, pp. 1-3.
Office Action dated Feb. 28, 2022 in IN Patent Application No. 201917053181, pp. 1-7.
Office Action dated Mar. 4, 2020 in U.S. Appl. No. 15/639,965, pp. 1-4.
Office Action dated Jun. 27, 2019 in U.S. Appl. No. 15/639,965, pp. 1-4.
Office Action dated Sep. 16, 2022 in U.S. Appl. No. 17/493,366, pp. 1-26.
Office Action dated Oct. 1, 2020 in U.S. Appl. No. 15/639,965, pp. 1-5.
Office Action dated Jul. 4, 2023 in IL Patent Application No. 271581, pp. 1-8.
Office Action dated Jul. 11, 2022 in IL Patent Application No. 271581, pp. 1-6.
U.S. Appl. No. 15/639,965, filed Jun. 30, 2017, pp. 1-25.
U.S. Appl. No. 17/493,366, filed Oct. 4, 2021, pp. 1-25.

* cited by examiner

METHODS, SYSTEMS, AND MEDIA FOR CONTROLLING APPEND-ONLY FILE REWRITES

CROSS-REFERENCE TO RELATED APPLICATIONS

This application is a continuation of U.S. patent application Ser. No. 17/493,366, filed Oct. 4, 2021, which is a continuation of U.S. patent application Ser. No. 15/639,965, filed Jun. 30, 2017, each of which is hereby incorporated by reference herein in its entirety.

TECHNICAL FIELD

The disclosed subject matter relates to methods, systems, and media for controlling append-only file rewrites.

BACKGROUND

As database access speed requirements continue to increase and the costs for random access memory (RAM) continue to decrease, the popularity of in-memory database systems continues to grow. In such database systems, rather than storing data in non-volatile storage devices like computer hard disks, data is stored in RAM, which is significantly faster.

A problem with in-memory databases that use volatile storage (such as RAM) is that the data stored therein can be easily lost in various circumstances, such as a power failure.

A popular approach to managing data-persistence in an in-memory database system is to write data to an append-only file (AOF) which is stored in non-volatile storage (e.g., such as a computer hard disk, a Storage Area Network (SAN), or a Network Attached Storage (NAS)) (which is also referred to herein as persistent storage). Typically, in such an approach, every "write" command received by the in-memory database is also written to the AOF stored on a computer non-volatile storage. Modern in-memory database systems like Redis provide multiple ways to control the "writes" of commands to the AOF, for example: a new line is written in the AOF for every "write" command; or all new "write" commands are written after N seconds to the AOF, where N has any suitable value.

In an event in which an in-memory database node fails and the data that was previously hosted in the node's RAM is lost, the AOF can be loaded to database memory to recover from the data loss.

The problem with the AOF approach is that the AOF tends to grow very quickly. This is the case because every "write" command that arrives at the database system is written as a new line of text in the AOF. Thus, multiple "write" commands for the same database object will result in multiple lines in the AOF, rather than just one.

To control the size of the AOF, an AOF rewrite event can be triggered in which the existing in-memory dataset is rewritten to a new AOF so that there is only one line for each object. Alternatively, a rewrite operation may create a new file in which its first part contains a snapshot of the in-memory dataset in a serialized and compressed way (in the Redis term this is called RDB format), and every new 'write' operation will be added to the file using AOF format. This event is usually triggered when the size of the AOF on the disk is N times larger (where N can have any suitable value) than the size of the dataset in RAM.

One way to implement AOF rewrite for in-memory database like Redis is to take a snapshot of the in-memory dataset using the Linux Copy On Write (COW) process. This guarantees that the new rewrite AOF represents a point in time state of the database. During the rewrite process, the in-memory database maintains two copies of the AOF: (1) the one that writes to the current AOF; and (2) the one that writes to the new rewrite AOF. In addition, the in-memory database maintains an internal in-memory buffer that includes all the changes that were made to the dataset from the time the snapshot was taken through the end of the AOF rewrite process.

An AOF rewrite process is completed when the entire dataset snapshot is written to the new AOF and all the changes that were made to the dataset since the snapshot was taken are also written to the new AOF.

A problem with AOF rewrite events is that they are disk-intensive operations. When the rewrite event happens, it can block updates to the in-memory database from being written to the current AOF, which can significantly delay the entire database execution time. Such characteristics can cause an in-memory database to violate standard terms of a service level agreement between a database service provider and its customer.

Accordingly, it is desirable to provide new methods, systems, and media for controlling append-only file rewrites.

SUMMARY

In accordance with various embodiments of the disclosed subject matter, methods, systems, and media for controlling append-only file rewrites are provided.

In accordance with some embodiments of the disclosed subject matter, methods for controlling append-only file rewrites are provided, the methods comprising: determining a utilization of a shard of a database; determining whether the utilization exceeds a persistent storage utilization threshold; determining a recovery time to recover the shard from an append-only file; determining whether the recovery time exceeds a recovery time threshold; and when the utilization is determined to exceed the utilization threshold or when the recovery time is determined to exceed the recovery time threshold, causing an append-only-file rewrite to be performed.

In accordance with some embodiments of the disclosed subject matter, systems for controlling append-only file rewrites are provided, the systems comprising: at least one hardware processor configured to: determine a utilization of a shard of a database; determine whether the utilization exceeds a persistent storage utilization threshold; determine a recovery time to recover the shard from an append-only file; determine whether the recovery time exceeds a recovery time threshold; and when the utilization is determined to exceed the utilization threshold or when the recovery time is determined to exceed the recovery time threshold, cause an append-only-file rewrite to be performed.

In accordance with some embodiments, non-transitory computer-readable media containing computer executable instructions that, when executed by a processor, cause the processor to perform a method for controlling append-only-file rewrites are provided, the method comprising: determining a utilization of a shard of a database; determining whether the utilization exceeds a persistent storage utilization threshold; determining a recovery time to recover the shard from an append-only file; determining whether the recovery time exceeds a recovery time threshold; and when the utilization is determined to exceed the utilization threshold or when the recovery time is determined to exceed the recovery time threshold, causing an append-only-file rewrite to be performed.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and/or media) for controlling append-only file (AOF) rewrites are provided.

Generally speaking, these mechanisms can control AOF rewrite events by triggering an AOF rewrite event when total persistent storage utilization meets or exceeds a threshold, when an AOF's utilization of an AOF quota meets or exceeds a threshold, when and/or when the time to recover the portion of the database from the AOF meets or exceeds a threshold. These mechanisms can work on a shard level, where a shard represents a subset of the database's dataset and is usually managed by a different process.

Figure 1:
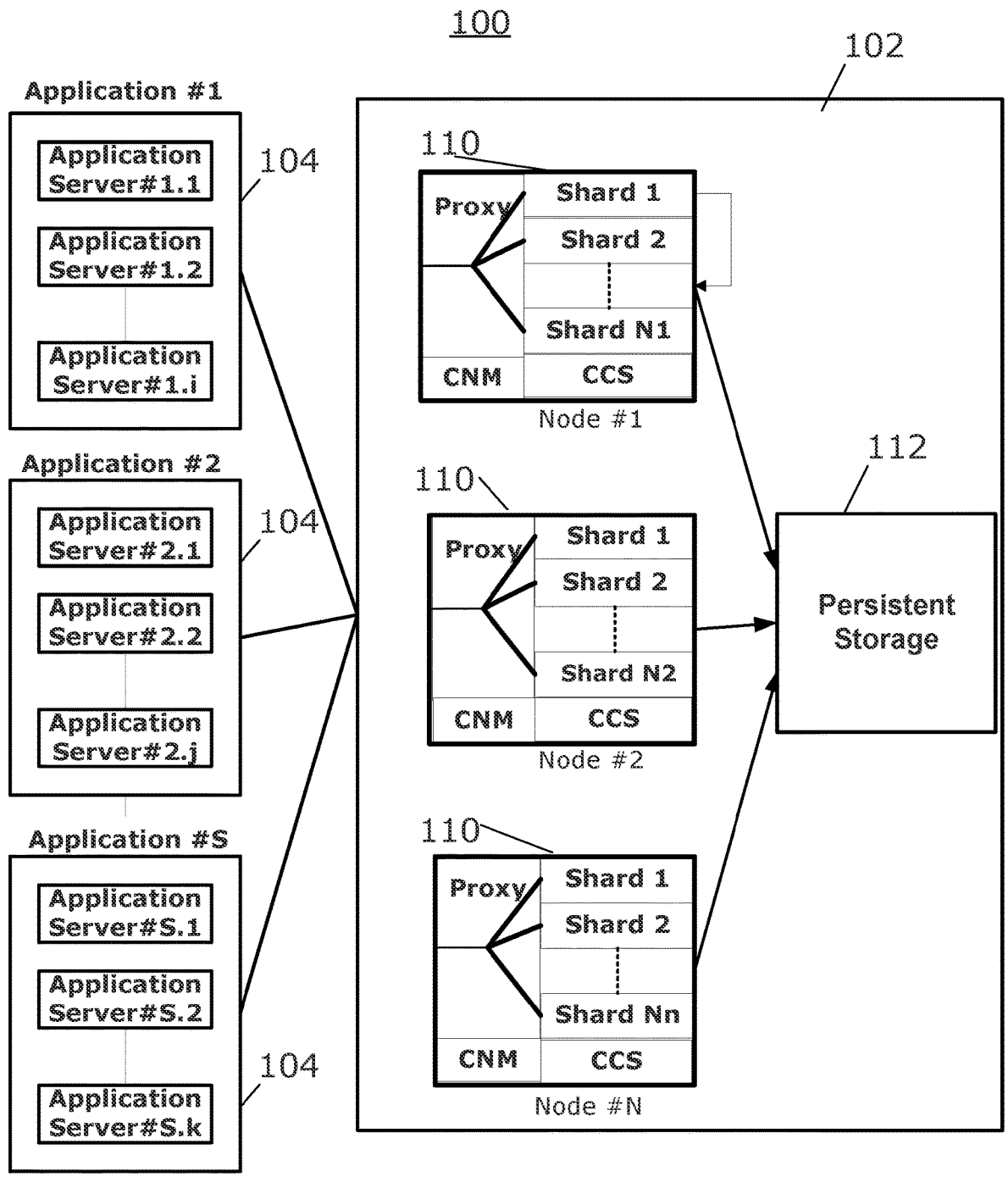
FIG. 1 is an example of a diagram of a cluster architecture in accordance with some embodiments of the disclosed subject matter.

In accordance with some embodiments, an example of in-memory non-relational database can be implemented as a system 100 as illustrated in FIG. 1. As shown, system 100 can include one or more clusters 102 and one or more applications 104.

Clusters 102 can include one or more clusters of nodes 110 for providing in-memory data storage as well as related functionality as described further below. Clusters 102 can also include any suitable persistent storage 112 that is coupled to nodes 110 in some embodiments.

Applications 104 can be one or more applications that use data and related information stored in nodes 110. As shown in FIG. 1, each application 104 can be executed using one or more servers. Any suitable servers can be used in some embodiments.

Figure 2:
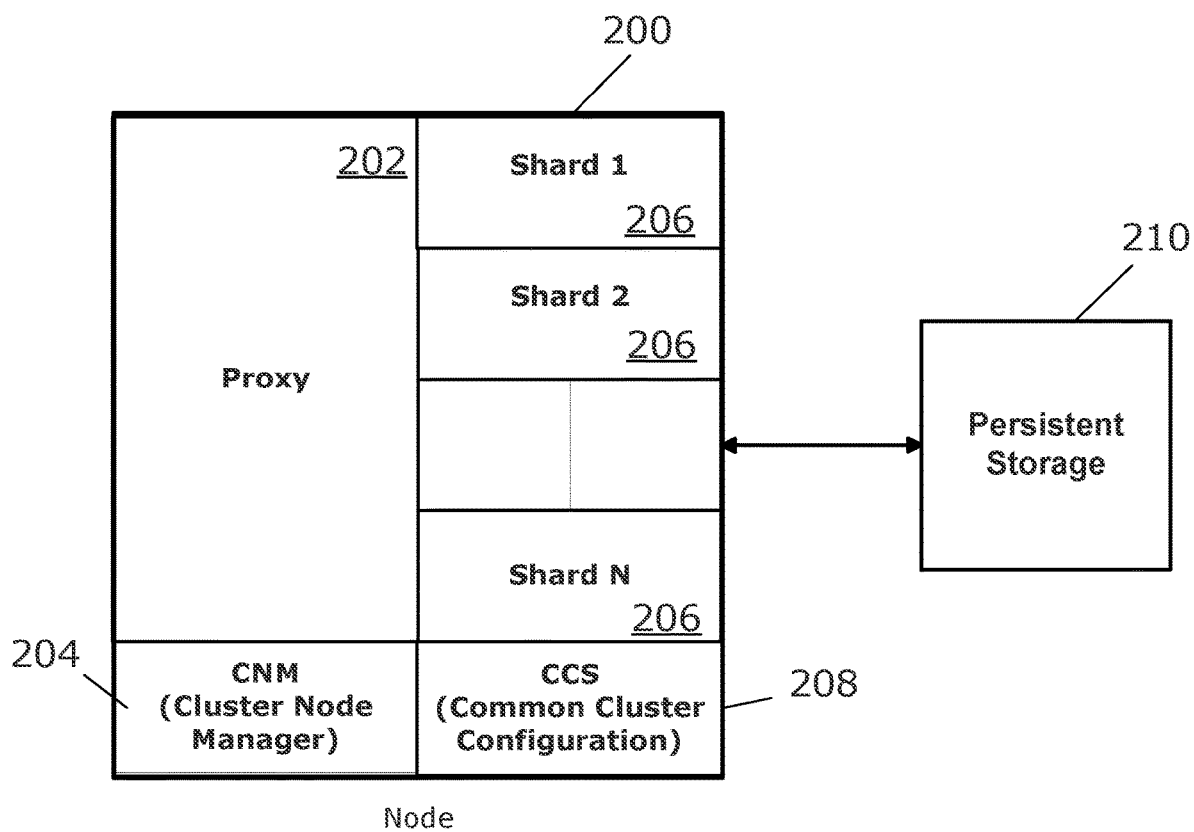
FIG. 2 is an example of a diagram of a node architecture in accordance with some embodiments of the disclosed subject matter.

Turning to FIG. 2, an example of a node 200 that can be used as a node 110 in a cluster 102 in accordance with some embodiments is illustrated. As shown, node 200 can include a proxy 202, a cluster node manager (CNM) 204, zero or more shards 206, and common cluster storage (CCS) 208, in some embodiments. Also, also shown in FIG. 2, node 200 can be coupled to any suitable persistent storage device 210 in some embodiments.

In accordance with some embodiments, proxy 202 can be used to manage the control flow of node 200, to manage the control flow between node 200 and one or more other nodes in the same cluster, and to manage the control flow between node 200 and one or more nodes in another cluster. Proxy 202 can also be used to perform client authentication in some embodiments, and request forwarding once a request is authenticated. Any suitable one or more client authentication mechanisms can be used. For example, Secured Socket Layer (SSL) Authentication, Simple Authentication and Security Layer (SASL) authentication, password authentication, source IP authentication, Amazon Web Service Security Group, and/or any other suitable authentication mechanisms can be used in some embodiments.

In accordance with some embodiments, cluster node manager (CNM) 204 can be used to perform node management functions and cluster management functions. For example, such functions can include provisioning/deprovisioning of a new database, shard migration (e.g., moving a shard from one node to another), re-sharding (e.g., adding more shard(s) to a database), auto-scaling (e.g., adding/removing nodes from the cluster, re-balancing (e.g., optimal re-ordering of the shards on cluster nodes), resource management (e.g., determining if a given shard has reached its maximum processing capacity, or is about to exceed its memory limit), and/or any other suitable function related to managing a node and/or a cluster.

In accordance with some embodiments, CNM 204 as a node manager can also provide a process for determining when to trigger an AOF rewrite event, performed by shard 206, such as the process described below in connection with FIG. 3.

In some embodiments, shard(s) 206 can be used to provide in-memory non-relational database functionality and any other suitable shard process(es). In some embodiments, the shard(s) can be based on the open-source Redis server with enhanced functionality. In some embodiments, the shard(s) can represent one of the following options: (1) a Redis database (DB); (2) a partition of a Redis DB; (3) a Memcached Bucket; or (4) a partition of a Memcached Bucket. In some embodiments, each cluster's node manages N shards 206, and there can be any suitable number of shards, including zero, in some embodiments.

In some embodiments, shard(s) 206 use persistent storage 210 to write its AOFs.

In accordance with some embodiments, common cluster store (CCS) 208 is an internal cluster repository service (which can be based on the Redis architecture). In some embodiments, this service can include a per shard, a per database, a per-node and a per-cluster configuration, statistics, and alert information. All the nodes in a cluster can be synchronized with the per-cluster configuration. The proxy and CNM can be registered to the CCS to receive configuration change events which are relevant to their operations.

In some embodiments, a node can store one or more shards of the database, which can include one or more database partitions. Each shard can be either a master of a shard or a slave of a shard such that a master of a shard can serve both read and write requests, and a slave of a shard can only serve read requests. In some embodiments, a single node can store multiple shards in any suitable combination of masters of shards and slaves of shards.

Figure 3:
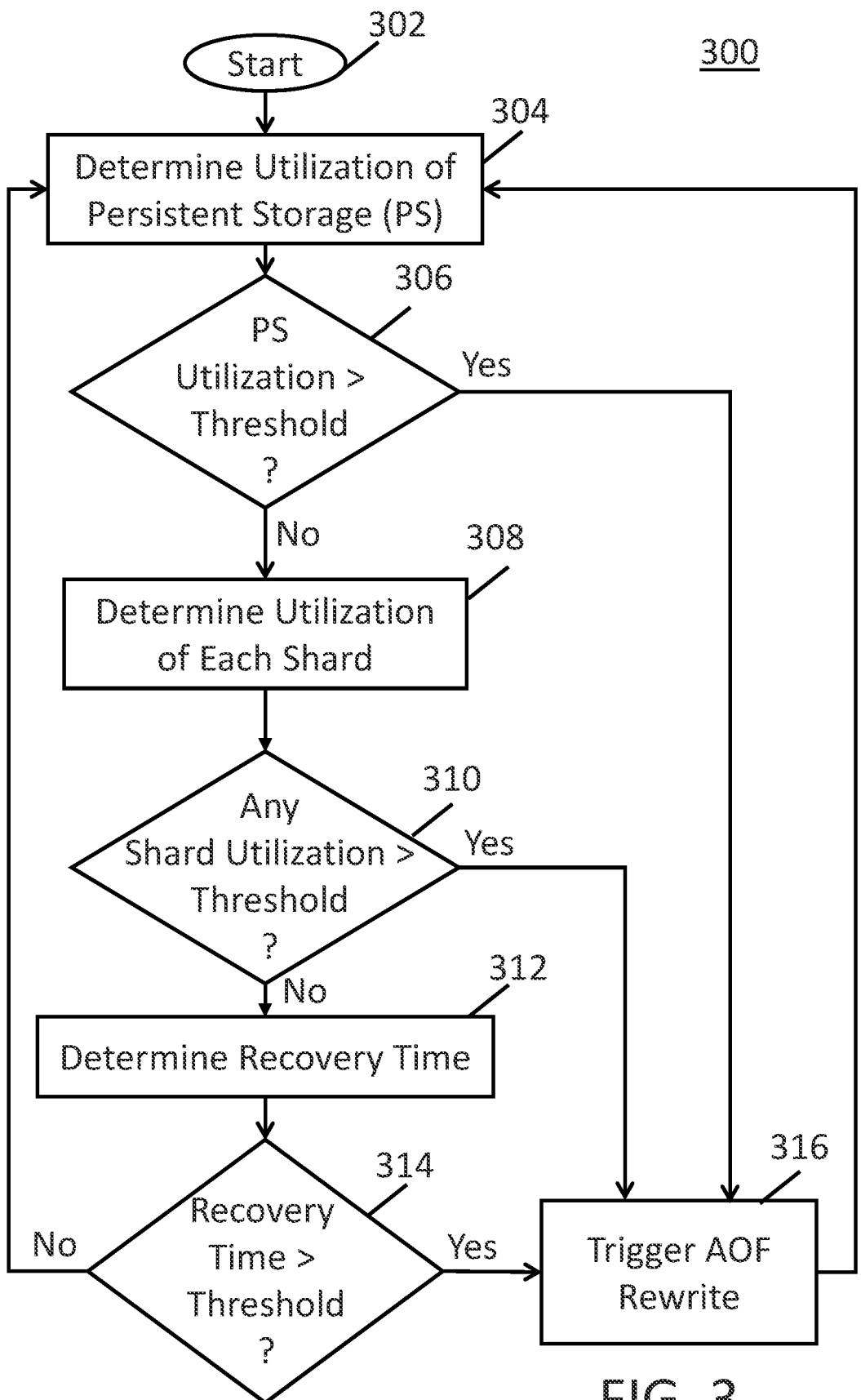
FIG. 3 is an example of a flow diagram of a process for determining whether to trigger an AOF rewrite event in accordance with some embodiments of the disclosed subject matter.

Turning to FIG. 3, an example 300 of a process for determining when to trigger an AOF rewrite operation for a node of a database is shown. In some embodiments, this process can be performed by a CNM 204.

As illustrated, after process 300 begins at 302, the process can determine the current total utilization of the persistent storage containing the AOFs for the shards of the node at 304. This determination can be made in any suitable manner. For example, in some embodiments, the total utilization of the persistent storage can be determined by dividing the sum of the sizes of all AOFs by the persistent storage size.

Next, at 306, process 300 can determine whether the current total utilization of the persistent storage is greater than (or greater than or equal to) a threshold for triggering an AOF rewrite. Any suitable threshold (or thresholds) can be used in some embodiments. For example, in some embodiments, the threshold can be 90%. As another example, in some embodiments, the threshold can be 80%.

Alternatively to determining current total utilization of the persistent storage as a percentage and comparing that current total utilization of the persistent storage to a threshold percentage at 304 and 306, absolute values of persistent storage space can be used for the current total utilization and threshold. More particularly, for example, in some embodiments, the current total utilization of the persistent storage can be equal to the sum of the sizes of the AOFs, and the threshold can be equal to the size of the persistent storage (or some percentage thereof).

If the current total utilization of the persistent storage is determined to be greater than (or greater than or equal to) the threshold for triggering an AOF rewrite at 306, process 300 can branch to 316 at which an AOF rewrite is triggered. Once the AOF rewrite is triggered at 316, process 300 can loop back to 304.

If process 300 determines that the current total utilization of the persistent storage is determined to be not greater than (or greater than or equal to) the threshold for triggering an AOF rewrite at 306, the process can determine the current utilization of the AOF with respect to the AOF's quota for each shard of the node at 308. This determination can be made in any suitable manner. For example, in some embodiments, the current utilization of an AOF for a shard can be determined by dividing the current AOF size for the shard by the maximum AOF size for the shard. The maximum AOF size for the shard can have any suitable value. For example, in some embodiments, the maximum size for the AOF can be equal to the RAM utilization of the shard on the database node (when expressed as a percentage) multiplied by the total usable persistent storage space. Thus, if the RAM utilization of the shard on the database node corresponds to 10% of the database node's usable RAM and the total usable persistent storage space is 100 GB, then the maximum file size can be calculated to be equal to 10 GB (10%*100 GB).

Next, at 310, process 300 can determine whether the AOF persistent storage utilization of any shard is greater than (or greater than or equal to) a threshold for triggering an AOF rewrite based on the persistent storage utilization. Any suitable threshold (or thresholds) can be used in some embodiments. For example, in some embodiments, the threshold can be 90%. As another example, in some embodiments, the threshold can be 80%.

Alternatively to determining persistent storage utilization as a percentage and comparing that persistent storage utilization to a threshold percentage at 308 and 310, absolute values of persistent storage sizes can be used for the AOF persistent storage utilization and threshold. More particularly, for example, in some embodiments, the AOF persistent storage utilization for a shard can be equal to the size of the AOF for the shard, and the threshold can be equal to the maximum AOF size (or some percentage thereof) for the shard (e.g., which can be calculated as described above).

If the persistent storage utilization of any shard is determined to be greater than (or greater than or equal to) the threshold for triggering an AOF rewrite at 310, process 300 can branch to 316 at which an AOF rewrite is triggered. Once the AOF rewrite is triggered at 316, process 300 can loop back to 304.

If the persistent storage utilization of any shard is determined to be not greater than (or greater than or equal to) the threshold for triggering an AOF rewrite at 310, process 300 can branch to 312 at which it can determine the recovery time for a recovery of the node from the AOFs for the node (i.e., the AOFs for all of the shards of the node). Process 300 can determine this recovery time in any suitable manner. For example, in some embodiments, this recovery time can be determined using the process of FIG. 4, which is described below.

Next, at 314, process 300 can determine whether the recovery time is greater than (or greater than or equal to) a threshold for triggering an AOF rewrite based on the recovery time. Any suitable threshold (or thresholds) can be used in some embodiments. For example, in some embodiments, the threshold can be equal to a maximum downtime specified in one or more service-level agreements to which the database must comply. More particularly, for example, this threshold can be one hour.

If the recovery time is determined to be greater than (or greater than or equal to) the threshold for triggering an AOF rewrite at 314, process 300 can branch to 316 at which an AOF rewrite is triggered. Once the AOF rewrite is triggered at 316, or if the recovery time of any shard is determined to be not greater than (or greater than or equal to) the threshold for triggering an AOF rewrite at 314, process 300 can loop back to 304.

Figure 4:
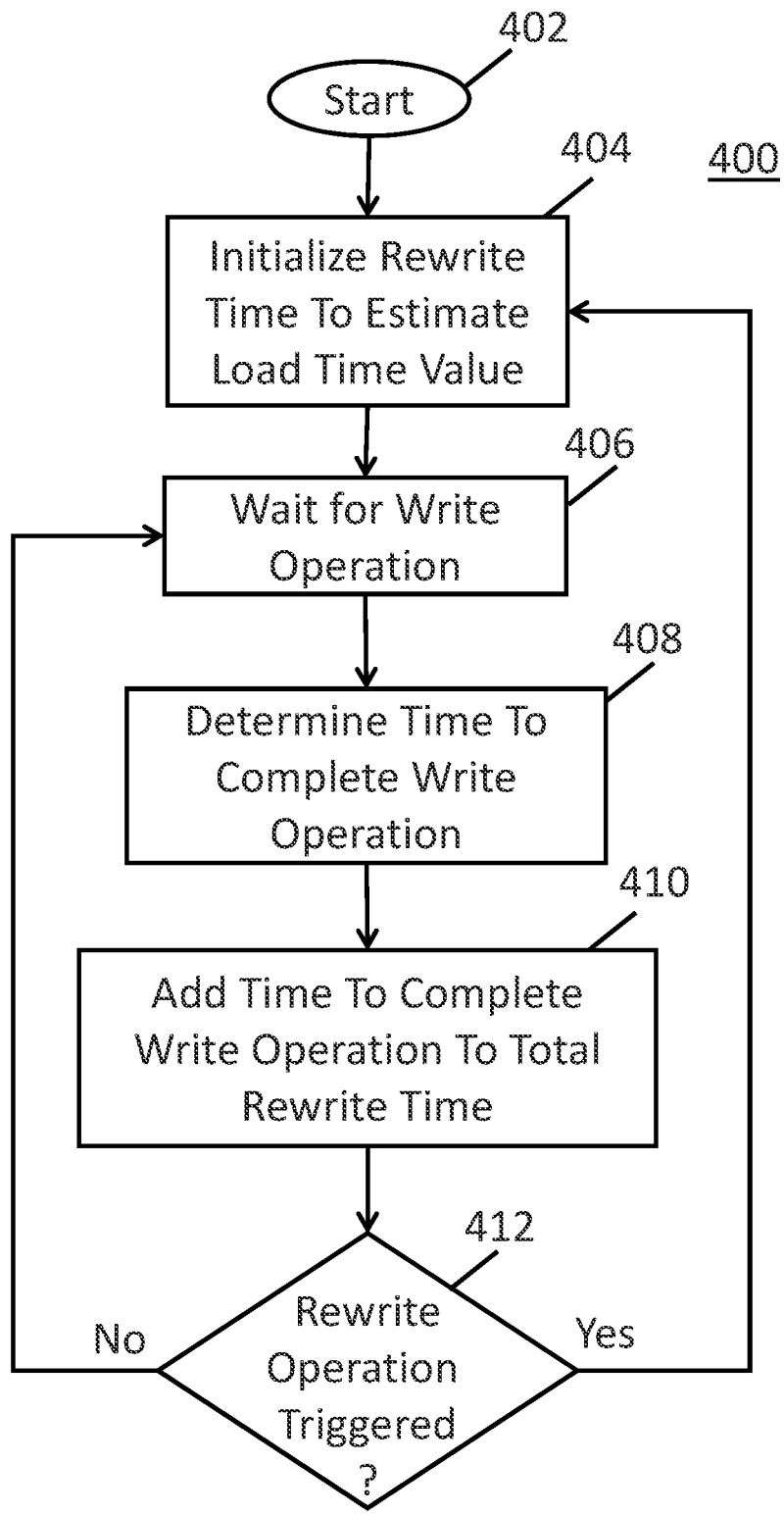
FIG. 4 is an example of a flow diagram of a process for determining a recovery time in accordance with some embodiments of the disclosed subject matter.

Turning to FIG. 4, an example 400 of a process for determining the recovery time for a recovery of the node from the AOFs for the node is shown. In some embodiments, this process can be performed by a combination of Shard 206 (FIG. 2) that accumulates the time it takes to execute each command in the AOF file and CNM 204 (FIG. 2) that compares the accumulated value to what is written in the CCS as recovery threshold and trigger an AOF rewrite operation when the threshold has reached. As illustrated, once process 400 begins at 402, the process can initialize the rewrite time for the shard to an estimated value at 404 that represents the estimated time it takes for the initial part of the AOF file to be loaded in-memory. This estimation can be based the number of keys in the shard and the read throughput provided by the persistent storage volume. Next, the process can wait for a write operation to the shard at 406.

Once a write operation is completed, process 400 can determine the time to complete the write operation. This determination can be made in any suitable manner. For example, in some embodiments, this determination can be made by measuring the execution time of any write operation that is written to the AOF.

Next, at 410, process 400 can add the time determined at 408 to a total rewrite time for the shard. Then, at 412, process can determine whether a rewrite operation has been triggered (e.g., as described above in connection with 312 of FIG. 3). If a rewrite operation has be determined to have been triggered, process 400 can loop back to 404. Otherwise, process 400 can loop back to 406.

As described above in connection with FIGS. 1 and 2, servers can be used to implement one or more application servers, clusters, and/or persistent storage. Any one or more of these servers can be any suitable general purpose device or special purpose device. As described further below, any of these general or special purpose devices can include any suitable components such as a hardware processor (which can be a microprocessor, a digital signal processor, a controller, etc.), memory, communication interfaces, display controllers, input devices, etc.

In some embodiments, communications between any two or more of the components described in connection with FIGS. 1 and 2 can be implemented using any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc.

Figure 5:
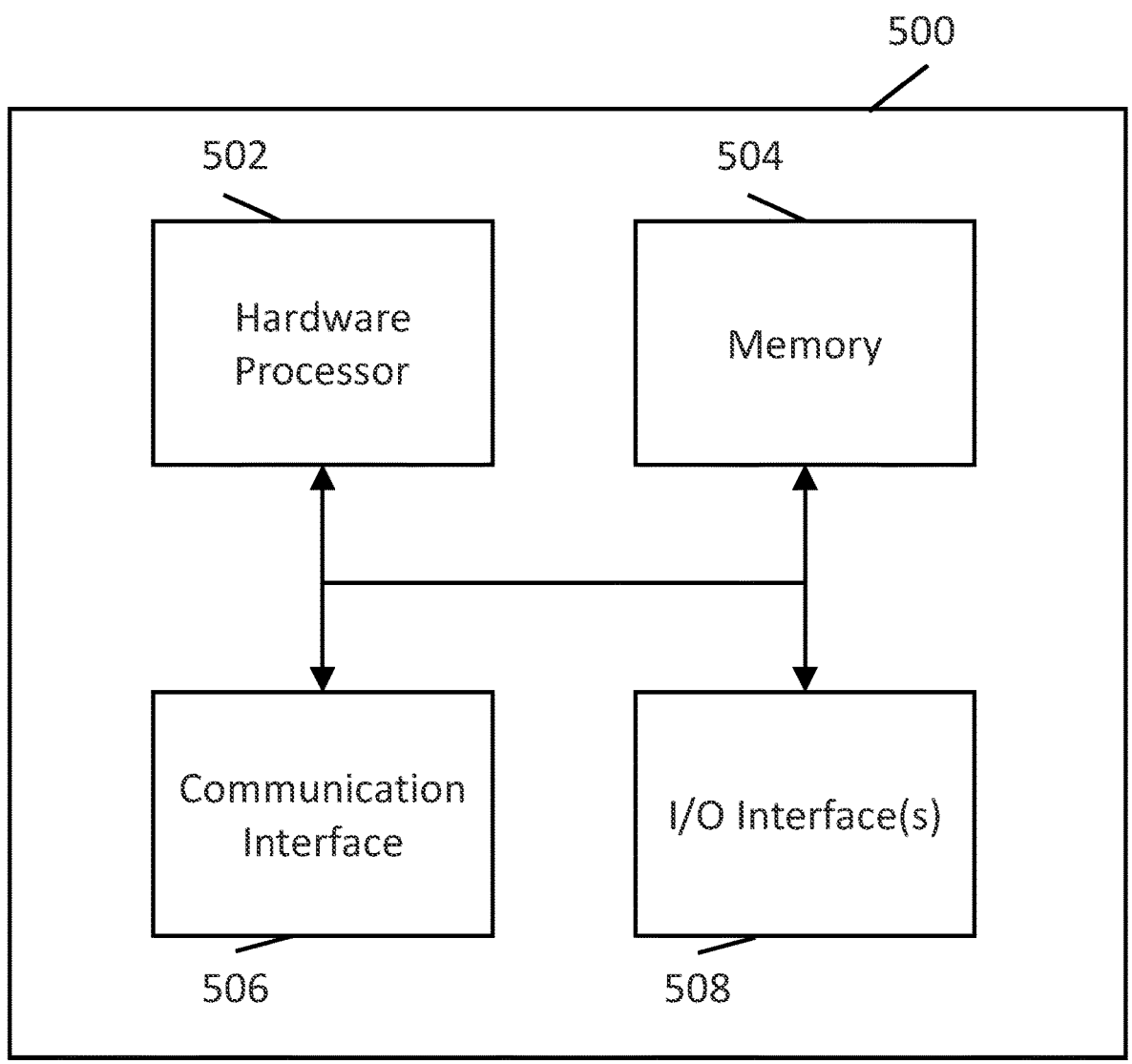
FIG. 5 is an example of a diagram of hardware that can be used to implement one or more of servers that can be used to implement any of the components depicted in FIGS. 1 and/or 2 in accordance with some embodiments.

FIG. 5 illustrates an example 500 of hardware that can be used to implement one or more of the servers in accordance with some embodiments. As shown, server 500 can include a hardware processor 502, memory 504, a communication interface 506, input/output interface(s) 508, and/or any other suitable components. Hardware processor 502 can be implemented using any suitable microprocessor, microcontroller, digital signal processor, etc. Memory 504 can be implemented using any suitable random access memory (RAM), read only memory (ROM), magnetic media, optical media, etc. Communication interface 506 can include any suitable one-way or two-way interface(s) for communicating over wires, optical fiber, airwaves, and/or any other suitable media. Input/output interface(s) 508 can include any suitable interface for receiving user input and/or providing output including keyboards, touch screens, pointer controls (mouse, mice, track ball, stylus, track pad, etc.), displays, audio outputs, etc.

In some embodiments, any suitable computer readable media can be used for storing instructions for performing the functions and/or processes described herein. This media can be part of or separate from memory 504 in some embodiments. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as random access memory (RAM), flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described steps of the processes of FIGS. 3 and 4 can be executed or performed in any order or sequence not limited to the order and sequence shown and described in the figures. Also, some of the above steps of the processes of FIGS. 3 and 4 can be executed or performed substantially simultaneously where appropriate or in parallel to reduce latency and processing times. Furthermore, it should be noted that FIGS. 3 and 4 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for controlling append-only-file (AOF) rewrites, comprising:
   prior to an AOF rewrite being performed, determining using a hardware processor a recovery time that is an estimate of a time to recover a portion of a database from a file when performing the AOF rewrite by at least adding write times for each of a plurality of write operations to the portion of the database;
   determining whether the recovery time exceeds a recovery time threshold; and
   when the recovery time is determined to exceed the recovery time threshold, causing the AOF rewrite to be performed.

2. The method of claim 1, wherein the recovery time threshold is based on a maximum downtime specified in a service level agreement.

3. The method of claim 1, wherein determining the recovery time includes:
   determining an initial estimated loading time of a snapshot part of the file;
   for each write operation of a plurality of write operations to the file, determining an amount of time required to complete the write operation; and
   summing the determined amounts of time for the plurality of write operations with the initial estimate loading time.

4. The method of claim 3, wherein the initial estimated loading time is based on a number of keys in the portion of the database.

5. The method of claim 3, wherein determining the amount of time required to complete the write operation includes measuring an execution time of a write operation to the file.

6. The method of claim 1, further comprising:
   determining a current total persistent storage utilization;
   determining whether the current total persistent storage utilization exceeds a total persistent storage utilization threshold; and
   when the current total persistent storage utilization exceeds the total persistent storage utilization threshold, causing an AOF rewrite to be performed.

7. A system for controlling append-only-file (AOF) rewrites, comprising:
   memory; and
   at least one hardware processor configured to at least:
   prior to an AOF rewrite being performed, determine a recovery time that is an estimate of a time to recover a portion of a database from a file when performing the AOF rewrite by at least adding write times for each of a plurality of write operations to the portion of the database;

determine whether the recovery time exceeds a recovery time threshold; and when the recovery time is determined to exceed the recovery time threshold, cause the AOF rewrite to be performed.

8. The system of claim 7, wherein the recovery time threshold is based on a maximum downtime specified in a service level agreement.

9. The system of claim 7, wherein the at least one hardware processor determines the recovery time by at least:
   determining an initial estimated loading time of a snapshot part of the file;
   for each write operation of a plurality of write operations to the file, determining an amount of time required to complete the write operation; and
   summing the determined amounts of time for the plurality of write operations with the initial estimated loading time.

10. The system of claim 9, wherein the initial estimated loading time is based on a number of keys in the portion of the database.

11. The system of claim 9, wherein determining the amount of time required to complete the write operation includes measuring an execution time of a write operation to the file.

12. The system of claim 7, wherein the at least one hardware processor is also configured to:
   determine a current total persistent storage utilization;
   determine whether the current total persistent storage utilization exceeds a total persistent storage utilization threshold; and
   when the current total persistent storage utilization exceeds the total persistent storage utilization threshold, cause an AOF rewrite to be performed.

13. A non-transitory computer-readable medium containing computer executable instructions that, when executed by a processor, cause the processor to perform a method for controlling append-only-file (AOF) rewrites, the method comprising:
   prior to an AOF rewrite being performed, determining a recovery time that is an estimate of a time to recover a portion of a database from a file when performing the AOF rewrite by at least adding write times for each of a plurality of write operations to the portion of the database;
   determining whether the recovery time exceeds a recovery time threshold; and
   when the recovery time is determined to exceed the recovery time threshold, causing the AOF rewrite to be performed.

14. The non-transitory computer-readable medium of claim 13, wherein the recovery time threshold is based on a maximum downtime specified in a service level agreement.

15. The non-transitory computer-readable medium of claim 13, wherein determining the recovery time includes:
   determining an initial estimated loading time of a snapshot part of the file;
   for each write operation of a plurality of write operations to the file, determining an amount of time required to complete the write operation; and
   summing the determined amounts of time for the plurality of write operations with the initial estimated loading time.

16. The non-transitory computer-readable medium of claim 15, wherein the initial estimated loading time is based on a number of keys in the portion of the database.

17. The non-transitory computer-readable medium of claim 15, wherein determining the amount of time required to complete the write operation includes measuring an execution time of a write operation to the file.

18. The non-transitory computer-readable medium of claim 13, wherein the method further comprises:
   determining a current total persistent storage utilization;
   determining whether the current total persistent storage utilization exceeds a total persistent storage utilization threshold; and
   when the current total persistent storage utilization exceeds the total persistent storage utilization threshold, causing an AOF rewrite to be performed.

\* \* \* \* \*